March 9, 1971  D. J. CUNNINGHAM  3,568,268
RELEASABLE CONNECTING DEVICE
Filed July 30, 1969  3 Sheets-Sheet 2

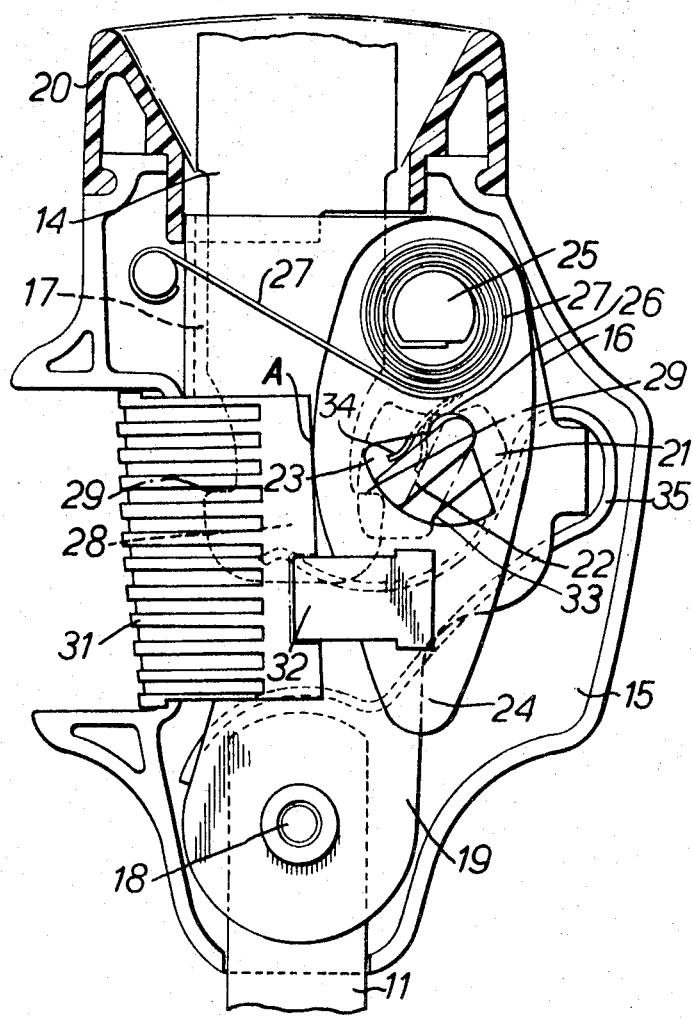

United States Patent Office 3,568,268
Patented Mar. 9, 1971

3,568,268
RELEASABLE CONNECTING DEVICE
Douglas James Cunningham, Chichester, England, assignor to Wingard Limited, Chichester, Sussex, England
Filed July 30, 1969, Ser. No. 846,025
Claims priority, application Great Britain, July 30, 1968, 36,210/68
Int. Cl. A44b 11/26
U.S. Cl. 24—230        5 Claims

ABSTRACT OF THE DISCLOSURE

A fastening device for releasably connecting two members incorporates a rigid frame, a release lever pivotally mounted on the frame, and a pawl angularly movable in aligned shaped openings in the frame and lever and adapted ot engage with a step or shoulder on a tongue inserted into the frame, the co-operation of the pawl with the openings being such that aforce acting to separate the members has a component acting on the release lever to hold it in the locked position when the members are engaged and a component urging the release lever away from the locked position after an initial movement in that direction effected manually.

---

This invention relates to an improved fastening device for releasably connecting two members.

One object of our invention is to provide a fastening device which provides a secure and effective connection between two members but which requires a minimum effort to release the connection when it is under load.

Our improved fastening device is particularly adapted to connecting two parts of a safety belt for use in vehicles or for connecting apart of the belt to a stationary anchorage, but it can be used for a wide variety of other purposes.

According to our invention, a fastening device comprises a frame adapted to receive a tongue or equivalent member having a step or shoulder on at least one side edge, a release lever pivoted in or on the frame, and a pawl or thrust member of which the ends are received in aligned shaped openings in parallel walls of the frame and release lever.

In the locked position of the device the pawl or thrust member is interposed between the step or shoulder on the tongue and edges of the openings in the release lever on the same side of the pivotal connection between the frame and the release lever as the tongue which is backed by a part of the frame. Any pull tending to separate the frame and tongue thus produces a toggle action and the connection is effectively locked.

To release the fastening the release lever is moved angularly about its pivot in the frame and the openings in the lever cause the pawl to rotate and its ends to move within the openings in the frame which guide the pawl into a position clear of the step or shoulder on the tongue so that the tongue can be withdrawn from the frame.

The release lever is then returned to its normal position by a spring and returns the pawl to its locking position, and when the tongue is inserted again into the frame the tongue can ride past the pawl until the pawl snaps into engagement with the step or shoulder on the tongue.

The spring which loads the release lever may also be arranged to eject the tongue from the frame when the pawl has been moved into the release position, or a separate spring may be provided for this purpose.

One form of fastening device in accordance with our invention designed for connecting a part of a safety seat belt to a stationary anchorage is illustrated by way of example in the acompanying drawings in which:

FIG. 3 is a similar view showing the movable parts of the device in the positions they assume just before release; and FIG. 4 is a fragmentary view from the opposite side of the locking pawl, its spring, and an aperture in the release lever in which it works.

Figure 1:
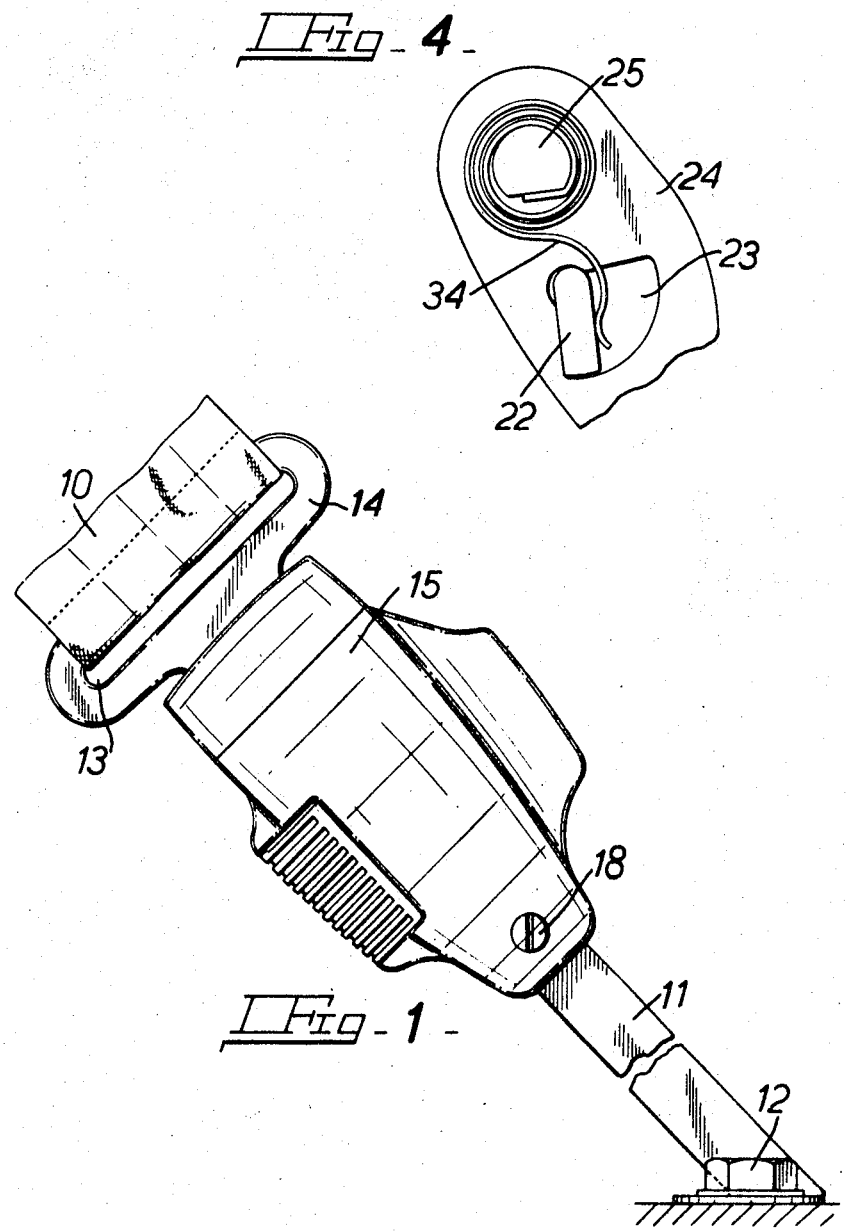
FIG. 1 is a side view of the fastening device and its connections in the fastened position.

The fastening device illustrated is designed for connecting a length of webbing 10 forming part of a safety seat belt to a rigid strap or bar 11 adapted to be secured to the floor or transmission tunnel of a vehicle by a bolt 12. The webbing 10 is threaded through a slot 13 in a flat tongue 1 which has a snap-in releasable engagement with the mechanism of the fastening device which is enclosed in a three-part moulded plastic housing 15, the tongue being freed by pressing inwardly a release member located in an opening in one side of the housing.

The frame 16 of the fastening mechanism is a sheet metal pressing folded to provide two parallel walls joined on one side by a radiused end wall 17. A screw or bolt 18 passing through downward extensions 19 of the parallel walls of the frame passes through a hole in the upper end of the strap or bar 11 to anchor it to the frame, the strap or bar being received between the walls of the frame. The screw or bolt 18 also serves to secure together the lower ends of the front and rear parts of the housing 15, the upper ends of these parts having a rib and groove engagement with a top moulding 20.

Aligned openings 21 of roughly L outline are formed in the walls of the frame to receive a pawl 22 which is a flat steel member of rectangular outline having a radiused upper edge. Opposite ends of the pawl extends into aligned quadrant-shaped openings 23 in a release lever 24 formed by flat plates located in front of and behind the frame and keyed on opposite ends of a pin 25 rotatably mounted in the upper part of the frame. A part-circular recess or notch 26 is formed in the corner of each opening 23 at the junction of the flat edges to receive the radiused upper edge of the pawl.

Figure 2:
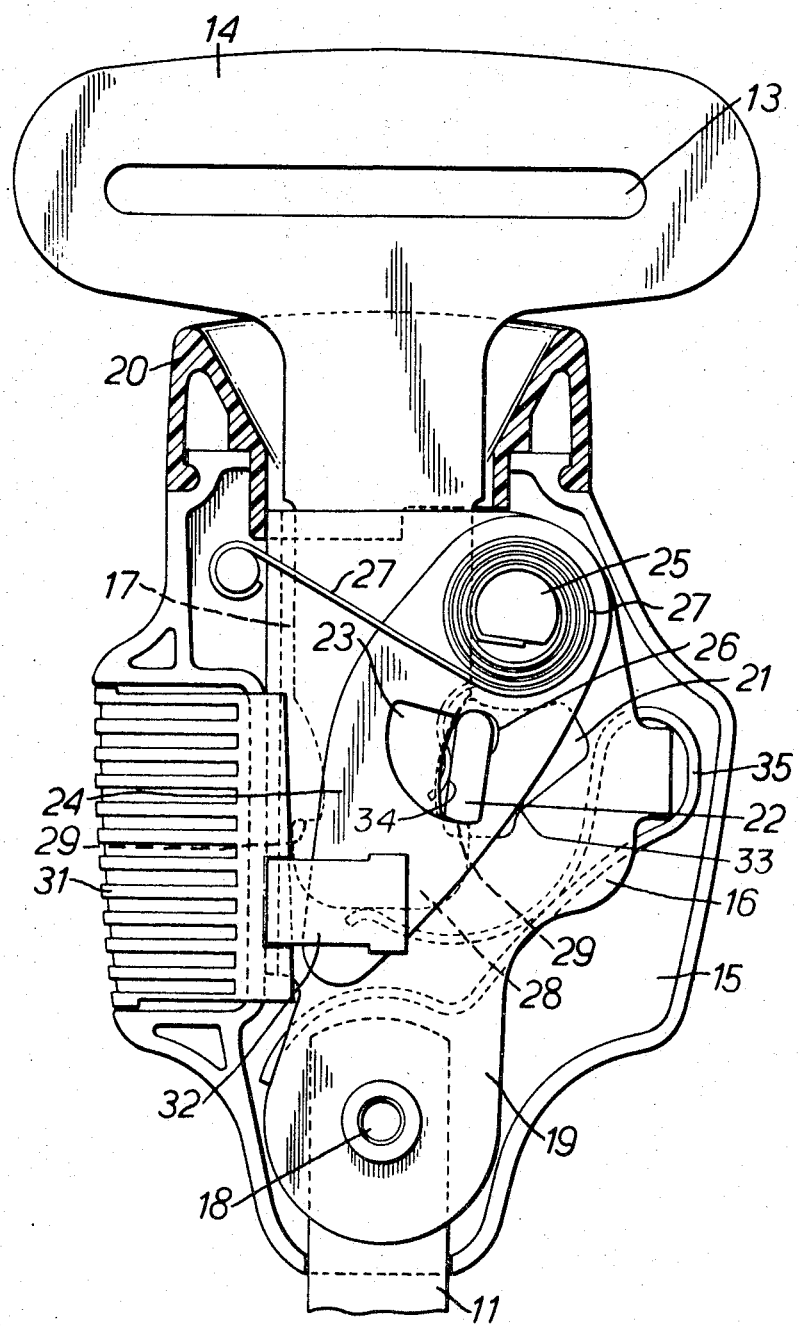
FIG. 2 is a front elevation of the fastening device with one half of the casing removed and the parts in the fastened position.

The pin 25 is loaded by a torsion spring 27 which normally holds the release lever in the position shown in FIG. 2. In this position the radiused upper edge of the pawl is located in the notches or recesses 26 in the openings 23 in the release lever and the pawl is held between the right hand edges of these openings and the left hand edges of the openings 21 in the frame.

The tongue 14 terminates at its free end in a nose 28 having radiused corners, and behind the nose the tongue is cut away on each side to provide a step or shoulder 29.

The release lever 24 is engaged by a push-button 31 which is a plastic moulding and is located in an opening in one side of the housing. The push-button is of U shape in cross-section and is movable in a direction at right angles to the length of the housing, the push-button embracing the adjacent part of the frame 16 as it is pushed inwardly. Inward extensions 32 of the limbs of the push-button are spaced apart sufficiently to embrace the release lever.

In the locked position of the mechanism shown in FIG. 2 the tongue 14 has been entered into the housing until the nose 28 has pushed the pawl 22 aside, and the adjacent step or shoulder 29 on the tongue has passed the pawl which is returned by the release lever into the locking position. The opposite edge of the tongue is guided and backed by the end wall 17 of the frame.

The pawl is now positioned as a rigid strut between the step or shoulder 29 on the tongue and the recesses 26 in the upper corners of the aligned openings 23 in the limbs of the release lever, and any pull on the tongue is taken by the frame through the release lever and the pin 25 on which the release lever is pivoted and which is itself mounted in the frame.

It will be observed that the pawl is inclined at a small angle to a line passing through its upper edge and the centre of the pin 25, the inclination being in such a direction that a toggle action is produced such that the force acting on the pawl due to a pull applied to the tongue has a component acting on the release lever in a direction to retain that lever in the locked position.

At the same time a minimum force other than that required to overcome the spring 27 is required to move the release lever and pawl out of the locked position.

To release the tongue the push-button 31 is pressed inwardly as shown in FIG. 3 and at first bears on the adjacent edge of the release lever 24 towards the free lower end of the lever. The release lever is moved angularly in an anti-clockwise direction about the pin 25 as an axis and takes the upper edge of the pawl with it owing to the engagement of that edge in the recess 26 in the opening 23 into which the pawl is urged by the upward force applied to it by the pull on the tongue when the strap attached to the tongue is under tension. The pawl "capsizes" or moves angularly about its upper edge within the opening 23 until it reaches substantially the position shown in FIG. 3.

The pawl is then in an unstable condition and the upward force exerted on it by the tongue has a component acting through the pawl to move the release lever in an anti-clockwise direction and so to carry the pawl clear of the step or shoulder 29 on the tongue and release the tongue. In the final position of the release lever the upper edge of the pawl has been carried into the top right hand corner of the opening 21 in the frame and the lower edge of the pawl bears against a shoulder 33 in the lower part of that opening.

It will be noted that owing to the curved outline of the edge of the release lever on which the push-button bears the point of engagement of the push-button with that edge has moved up from the lower end of the lever to the position A as shown in FIG. 3, the velocity ratio between the push-button and the release lever increasing as the effort required on the push-button to move the release lever angularly is reduced.

On release of the push-button the parts are returned by the spring 27 to the positions shown in FIG. 2, the return of the pawl to its normal angular position within the opening 21 being assisted by a torsion spring 34 mounted on the pin 25 behind the frame and bearing on the pawl as shown in FIG. 4.

Preferably the frame incorporates a spring 35 which bears on the inner end of the tongue when the fastening is in its locked position and ejects the tongue as soon as it is released from the pawl.

In the mechanism illustrated and described above the release lever is actuated by a push-button slidably mounted in the housing, but various other means for actuating the lever may be employed.

I claim:

1. A fastening device for releasably connecting two members of which the first member has a snap-in engagement with the second member in which it is retained by a manually releasable latch member, wherein the first member comprises a generally flat tongue having a shoulder on at least one edge and the second member comprises a rigid frame, a spring-pressed release lever pivotally mounted on the frame, shaped aligned openings in the frame and release lever, and a pawl located in said openings and angularly movable therein on angular movement of the release lever between a locking position in which the pawl is interposed between the shoulder on the first member and an edge of the opening in the release member through which any force tending to separate the members so transmitted to the frame and a releasing position in which the pawl is disengaged from said shoulder, said lever and pawl being movable in a plane substantially common to the plane of said tongue.

2. A fastening device as in claim 1 wherein, when the release lever is in the locking position, the pawl is located between the shoulder on the first member and an edge of the opening in the release lever on the same side of the pivotal connection between the frame and the release lever as the shoulder on the tongue, and the pawl is inclined at such an angle that any force tending to separate the members has a component acting through the pawl on the release lever in a direction to retain the lever in the locking position.

3. A fastening device as in claim 1 wherein the opening in the release lever is of quadrant shape and the pawl has a radiused edge received in a notch in the course of the opening which is directed towards the pivotal connection between the release lever and the frame, and angular movement of the release lever away from the locking position displaces said radiused edge of the pawl away from the first member and produces angular movement of the pawl within the opening in the release member into a position in which any force tending to separate the members has a component acting through the pawl on the release lever in a direction urging the release lever away from the locked position to carry the pawl clear of the shoulder on the first member.

4. A fastening device as in claim 1 wherein the frame of the second member comprises spaced parallel walls connected by an end wall, the first member being received between said walls and being backed by said end wall, the release lever comprises spaced walls located adjacent to the walls of the frame and keyed on a pin rotatably mounted in the frame, and the pawl is a flat steel member free to move angularly within aligned shaped openings in the walls of the frame and the release lever.

5. A fastening device as in calim 4 wherein the frame of the second member is mounted in a moulded plastic housing and movement of the release lever out of the locking position into which it is urged by a spring is effected by a manually operable member accessible through an opening in said housing.

References Cited
UNITED STATES PATENTS

| 2,908,511 | 10/1959 | Rogers | 24—230.1UUX |
| 3,091,010 | 5/1963 | Davis | 24—230.1UX |
| 3,145,442 | 8/1964 | Brown | 24—230.1UX |
| 3,453,699 | 7/1969 | Smith | 24—230.1UX |

BERNARD A. GELAK, Primary Examiner